(12) United States Patent
Qin

(10) Patent No.: US 11,055,829 B2
(45) Date of Patent: Jul. 6, 2021

(54) PICTURE PROCESSING METHOD AND APPARATUS

(71) Applicant: Huawei Technologies Co., Ltd., Shenzhen (CN)

(72) Inventor: Chao Qin, Bejing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 16/474,479

(22) PCT Filed: Dec. 29, 2016

(86) PCT No.: PCT/CN2016/113217
§ 371 (c)(1),
(2) Date: Jun. 27, 2019

(87) PCT Pub. No.: WO2018/119938
PCT Pub. Date: Jul. 5, 2018

(65) Prior Publication Data
US 2019/0340732 A1   Nov. 7, 2019

(51) Int. Cl.
*G06K 9/00* (2006.01)
*G06T 5/00* (2006.01)
*G06T 7/70* (2017.01)
*G06K 9/46* (2006.01)
*G06K 9/48* (2006.01)
*G06T 7/40* (2017.01)
*G06T 7/60* (2017.01)

(52) U.S. Cl.
CPC .......... *G06T 5/006* (2013.01); *G06K 9/00228* (2013.01); *G06K 9/00281* (2013.01); *G06K 9/4652* (2013.01); *G06K 9/48* (2013.01); *G06T 5/002* (2013.01); *G06T 7/40* (2013.01); *G06T 7/60* (2013.01); *G06T 7/70* (2017.01); *G06T 2207/30201* (2013.01)

(58) Field of Classification Search
CPC .......... G06T 5/006; G06T 7/70; G06T 5/002; G06T 7/40; G06T 7/60; G06T 2207/30201; G06K 9/00228; G06K 9/00281; G06K 9/4652; G06K 9/48
See application file for complete search history.

(56) References Cited

U.S. PATENT DOCUMENTS

| 5,640,217 A | 6/1997 | Hautcoeur et al. |
| 6,944,327 B1 * | 9/2005 | Soatto ................... G02C 13/003 351/159.75 |
| 7,930,151 B2 * | 4/2011 | Haser ..................... G02C 7/024 703/2 |

(Continued)

FOREIGN PATENT DOCUMENTS

| CN | 1173926 A | 2/1998 |
| CN | 102163289 A | 8/2011 |

(Continued)

*Primary Examiner* — Gregory M Desire
(74) *Attorney, Agent, or Firm* — Slater Matsil, LLP

(57) ABSTRACT

A type of glasses worn on a human face in a to-be-processed picture is detected, and a lens area of the glasses is determined; and a deformation model of the lens area is determined based on the type of the glasses, where the deformation model is used to indicate deformation caused by the glasses on an image in the lens area, and then the image in the lens area is restored based on the deformation model.

20 Claims, 7 Drawing Sheets

Detect a facial image in a to-be-processed picture, and determine an eye position of the facial image — 201

Extract a glasses contour feature of the facial image based on the eye position of the facial image — 202

Extract a texture feature in a glasses contour of the facial image, and determine a type of glasses based on the texture feature in the glasses contour of the facial image — 203

(56) References Cited

U.S. PATENT DOCUMENTS

| | | | | |
|---|---|---|---|---|
| 8,919,955 | B2* | 12/2014 | Hsieh | G02C 13/003 |
| | | | | 351/204 |
| 9,463,115 | B2* | 10/2016 | Dick | A61B 3/102 |
| 9,892,561 | B2* | 2/2018 | Choukroun | G06K 9/00281 |
| 9,916,690 | B2* | 3/2018 | Nobori | G06T 5/006 |
| 9,977,248 | B1* | 5/2018 | Xie | H01L 27/156 |
| 10,191,276 | B2* | 1/2019 | Du | G02B 27/0068 |
| 10,330,958 | B2* | 6/2019 | Fonte | G06F 30/00 |
| 10,551,638 | B2* | 2/2020 | Du | G02C 11/10 |
| 2003/0156125 | A1 | 8/2003 | Welk et al. | |
| 2013/0265543 | A1 | 10/2013 | Iwase et al. | |
| 2019/0340732 | A1* | 11/2019 | Qin | G06T 7/60 |

FOREIGN PATENT DOCUMENTS

| | | | |
|---|---|---|---|
| CN | 102542255 | A | 7/2012 |
| CN | 103323945 | A | 9/2013 |
| CN | 103376662 | A | 10/2013 |
| CN | 104306102 | A | 1/2015 |
| CN | 104408426 | A | 3/2015 |
| CN | 104992417 | A | 10/2015 |
| CN | 105205779 | A | 12/2015 |
| CN | 106131409 | A | 11/2016 |
| EP | 1306068 | A2 | 5/2003 |
| WO | 2012069980 | A2 | 5/2012 |

* cited by examiner

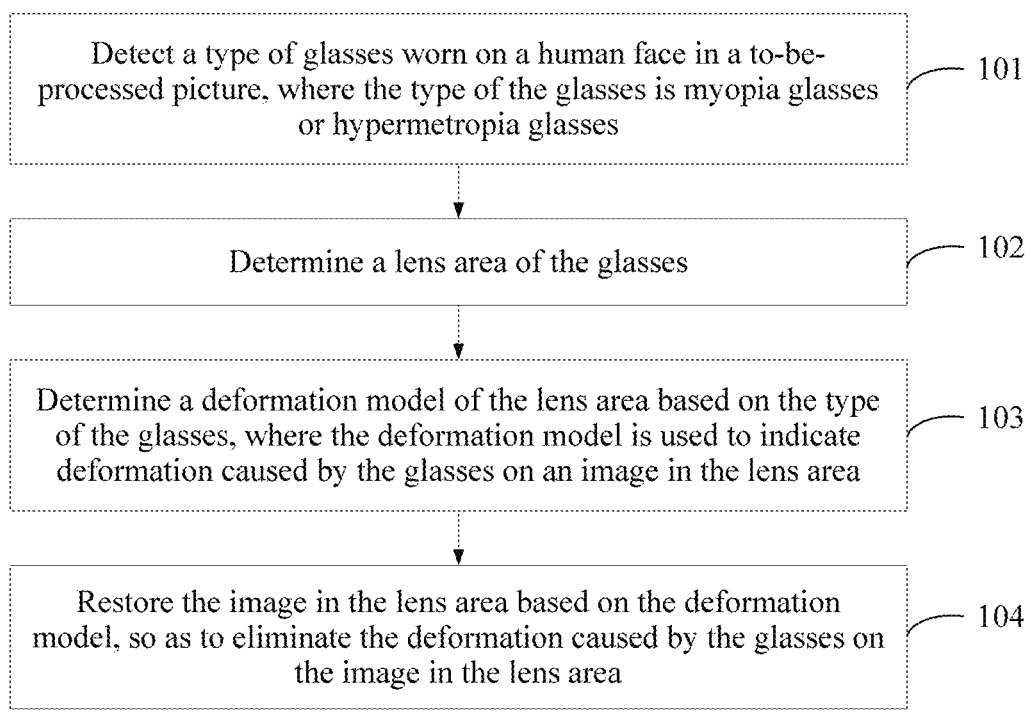
FIG. 1
 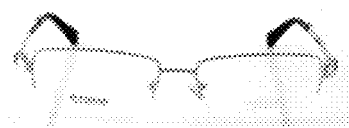
FIG. 2a     FIG. 2b

PICTURE PROCESSING METHOD AND APPARATUS

CROSS-REFERENCE TO RELATED APPLICATIONS

This application is a national stage of International Application No. PCT/CN2016/113217, filed on Dec. 29, 2016, which is hereby incorporated herein by reference.

TECHNICAL FIELD

Embodiments of the present invention relate to image processing technologies, and in particular, to a picture processing method and apparatus.

BACKGROUND

Currently, approximately half of the world's population are myopic, and among myopic people, many people choose to wear frame glasses. In a photo taken with the frame glasses, an eye area is zoomed out because of lens refraction. The closer to an edge of the glasses it is, the greater deformation is, causing a facial contour to be obviously zoomed out. There is a sharp turn to a facial contour of an area that is not covered by a lens.

Currently, there is various portrait beautification software on a mobile phone, and the beautification software can provide only functions such as eye brightening, dark circle removal, and eye magnification. The eye magnification function can magnify only an eyeball part. The closer to an eye center it is, the more obvious magnification is, in particular, a pupil part. However, the beautification software cannot restore an entire glasses area, the facial contour still has a turn, and a position of an eyeball still needs to be manually selected

SUMMARY

Embodiments of the present invention provide a picture processing method and apparatus, so as to eliminate deformation caused by glasses on an image in a lens area, so that a picture is closer to a real picture and is more beautiful.

A first aspect of the present invention provides a picture processing method, including: detecting a type of glasses worn on a human face in a to-be-processed picture, where the type of the glasses is myopia glasses or hypermetropia glasses; determining a lens area of the glasses; determining a deformation model of the lens area based on the type of the glasses, where the deformation model is used to indicate deformation of an image in the lens area; and restoring the image in the lens area based on the deformation model, so as to eliminate the deformation caused by the glasses on the image in the lens area. The deformation caused by the glasses on the image in the lens area is eliminated, so that the to-be-processed picture is closer to a real picture and is more beautiful.

In a possible implementation, a facial image in the to-be-processed picture is detected, an eye position of the facial image is determined, a glasses contour of the facial image is extracted based on the eye position of the facial image, a texture feature in the glasses contour is extracted, and the type of the glasses is determined based on the texture feature.

In a possible implementation, a facial image in the to-be-processed picture is detected, an eye position of the facial image is determined, a facial contour feature of the facial image is extracted based on the eye position of the facial image, and the type of the glasses is determined based on the facial contour feature.

In a possible implementation, the determining the type of the glasses based on the facial contour feature is specifically: when the facial contour is shifted inwards, determining that the type of the glasses is the myopia glasses; and when the facial contour is shifted outwards, determining that the type of the glasses is the hypermetropia glasses.

In a possible implementation, the determining the type of the glasses based on the texture feature in the glasses contour of the facial image is specifically: determining, based on the texture feature in the glasses contour, whether a texture in the glasses contour is tight; when the texture in the glasses contour is tight, determining that the type of the glasses is the myopia glasses; and when the texture in the glasses contour is not tight, determining that the type of the glasses is the hypermetropia glasses.

In a possible implementation, the determining a lens area of the glasses is specifically: determining a position of the human face in the to-be-processed picture; extracting the facial contour feature of the human face based on a skin color feature of the human face; detecting a turning point of a facial contour around an eye in the human face based on the facial contour feature; and when a turning point exceeding an eye height is detected in the facial contour, determining that a contour between turning points is a lens frame, where an area within the lens frame is the lens area of the glasses. Alternatively, positions of the human face and the eye in the to-be-processed picture are detected, a color difference around the eye and an edge contour are detected based on the positions of the human face and the eye, and the glasses frame is determined based on the color difference around the eye and the edge contour, where an area within the glasses frame is the lens area of the glasses.

In a possible implementation, the determining a deformation model of the lens area based on the type of the glasses is specifically:

when the type of the glasses is the myopia glasses, determining an optical center position of a lens;

drawing a plurality of straight lines by passing through the optical center, a first contour line of the human face inside the lens, and a second contour line of the human face outside the lens; and separately calculating a mapping slope of each straight line, where the mapping slope is a parameter of the deformation model, and the mapping slope is greater than 1; and the restoring the image in the lens area based on the deformation model includes:

calculating a position of each pixel on each straight line before deformation based on the mapping slope of each straight line;

determining whether the position of each pixel before deformation exceeds the lens frame;

when the position of any pixel before deformation does not exceed the lens frame, reserving the pixel;

when the position of any pixel before deformation exceeds the lens frame, discarding the pixel; and performing interpolation and smoothing processing on positions of all reserved pixels after deformation, to obtain an image after the image in the lens area is restored.

When the type of the glasses is the hypermetropia glasses, an optical center position of a lens is determined;

a plurality of straight lines are drawn by passing through the optical center, a first contour line of the human face inside the lens, and a second contour line of the human face outside the lens; and a mapping slope of each straight line is separately calculated, where the mapping slope is a parameter of the deformation model, and the mapping slope is less than 1; and the restoring the image in the lens area based on the deformation model includes:

calculating a position of any pixel on each straight line before deformation based on the mapping slope of each straight line;

obtaining a first image based on positions of all pixels in the lens area before deformation, where there is a blank interval between the first image and the lens frame;

filling in the blank interval by using a pixel outside the lens area or a pixel in the first image; and performing interpolation and smoothing processing on the pixel of the first image and a pixel of the blank interval, to obtain an image after the image in the lens area is restored.

In a possible implementation, slopes of the plurality of the straight lines are the same.

In a possible implementation, slopes of the plurality of the straight lines are different, and the separately calculating a mapping slope of each straight line includes:

calculating a slope of a first straight line, where the first straight line is any one of the plurality of the straight lines;

calculating a slope of a second straight line adjacent to the first straight line;

calculating a slope change rate based on the slope of the first straight line and the slope of the second straight line; and calculating a slope of another straight line based on the slope change rate and the slope of the first straight line.

A second aspect of the present invention provides a picture processing apparatus, including a memory and a processor, where the memory is configured to store an instruction, and the processor is configured to execute the instruction stored in the memory, so as to perform the following method:

detecting a type of glasses worn on a human face in a to-be-processed picture, where the type of the glasses is myopia glasses or hypermetropia glasses;

determining a lens area of the glasses;

determining a deformation model of the lens area based on the type of the glasses, where the deformation model is used to indicate deformation caused by the glasses on an image in the lens area; and restoring the image in the lens area based on the deformation model, so as to eliminate the deformation caused by the glasses on the image in the lens area.

In a possible implementation, when detecting the type of the glasses worn on the human face in the to-be-processed picture, the processor is specifically configured to:

detect a facial image in the to-be-processed picture, and determine an eye position of the facial image;

extract a glasses contour feature of the facial image based on the eye position of the facial image; and extract a texture feature in a glasses contour of the facial image, and determine the type of the glasses based on the texture feature in the glasses contour of the facial image.

Alternatively, the processor is specifically configured to: detect a facial image in the to-be-processed picture, and determine an eye position of the facial image;

extract a facial contour feature of the facial image based on the eye position of the facial image; and determine the type of the glasses based on the facial contour feature.

In a possible implementation, when the facial contour is shifted inwards, the type of the glasses is determined as the myopia glasses. When the facial contour is shifted outwards, the type of the glasses is determined as the hypermetropia glasses.

In a possible implementation, when the texture in the glasses contour is tight, the type of the glasses is determined as the myopia glasses. When the texture in the glasses contour is not tight, the type of the glasses is determined as the hypermetropia glasses.

In a possible implementation, when determining the lens area of the glasses, the processor is specifically configured to: determine a position of the human face in the to-be-processed picture; extract the facial contour feature of the human face based on a skin color feature of the human face; detect a turning point of a facial contour around an eye in the human face based on the facial contour feature; and when a turning point exceeding an eye height is detected in the facial contour, determine that a contour between turning points is a lens frame, where an area within the lens frame is the lens area of the glasses. Alternatively, the processor is specifically configured to: detect positions of the human face and the eye in the to-be-processed picture; detect a color difference around the eye and an edge contour based on the positions of the human face and the eye; and determine the glasses frame based on the color difference around the eye and the edge contour, where an area within the glasses frame is the lens area of the glasses.

In a possible implementation, when determining the deformation model of the lens area based on the type of the glasses, the processor is specifically configured to:

when the type of the glasses is the myopia glasses, determine an optical center position of a lens;

draw a plurality of straight lines by passing through the optical center, a first contour line of the human face inside the lens, and a second contour line of the human face outside the lens;

separately calculate a mapping slope of each straight line, where the mapping slope is a parameter of the deformation model, and the mapping slope is greater than 1;

calculate a position of each pixel on each straight line before deformation based on the mapping slope of each straight line;

determine whether the position of each pixel before deformation exceeds the lens frame;

when the position of any pixel before deformation does not exceed the lens frame, reserve the pixel;

when the position of any pixel before deformation exceeds the lens frame, discard the pixel; and perform interpolation and smoothing processing on positions of all reserved pixels after deformation, to obtain an image after the image in the lens area is restored.

Alternatively, the processor is specifically configured to: when the type of the glasses is the hypermetropia glasses, determine an optical center position of a lens;

draw a plurality of straight lines by passing through the optical center, a first contour line of the human face inside the lens, and a second contour line of the human face outside the lens;

separately calculate a mapping slope of each straight line, where the mapping slope is a parameter of the deformation model, and the mapping slope is less than 1;

calculate a position of any pixel on each straight line before deformation based on the mapping slope of each straight line;

obtain a first image based on positions of all pixels in the lens area before deformation, where there is a blank interval between the first image and the lens frame;

fill in the blank interval by using a pixel outside the lens area or a pixel in the first image; and perform interpolation and smoothing processing on the pixel of the first image and a pixel of the blank interval, to obtain an image after the image in the lens area is restored.

In a possible implementation, slopes of the plurality of the straight lines are the same.

In a possible implementation, slopes of the plurality of the straight lines are different, and the processor is specifically configured to:

calculate a slope of a first straight line, where the first straight line is any one of the plurality of the straight lines;

calculate a slope of a second straight line adjacent to the first straight line;

calculate a slope change rate based on the slope of the first straight line and the slope of the second straight line; and calculate a slope of another straight line based on the slope change rate and the slope of the first straight line.

According to the picture processing method and apparatus provided in the embodiments of the present invention, the type of the glasses worn on the human face in the to-be-processed picture is detected, and the lens area of the glasses is determined; and the deformation model of the lens area is determined based on the type of the glasses, where the deformation model is used to indicate deformation caused by the glasses on the image in the lens area, and then the image in the lens area is restored based on the deformation model, so as to eliminate the deformation caused by the glasses on the image in the lens area. The deformation caused by the glasses on the image in the lens area is eliminated, so that the to-be-processed picture is closer to a real picture and is more beautiful.

BRIEF DESCRIPTION OF THE DRAWINGS

FIG. 1 is a flowchart of a picture processing method according to Embodiment 1 of the present invention;

FIG. 2a is a schematic diagram having obvious-frame glasses;

FIG. 2b is a schematic diagram having unobvious-frame glasses;

DETAILED DESCRIPTION OF ILLUSTRATIVE EMBODIMENTS

Figure 3:
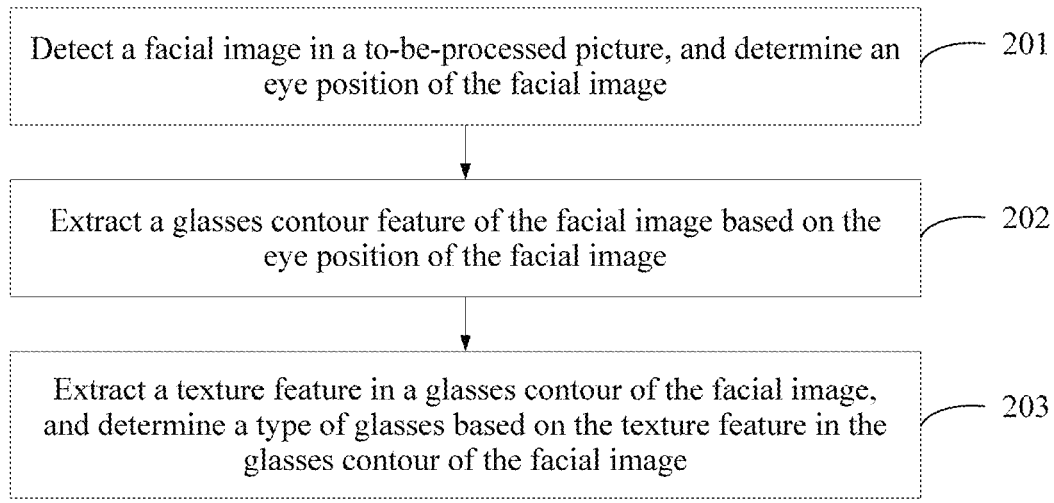
FIG. 3 is a flowchart of a glasses type detection method according to Embodiment 2 of the present invention.

FIG. 1 is a flowchart of a picture processing method according to Embodiment 1 of the present invention. The method in this embodiment is performed by an image processing apparatus. The image processing apparatus may be specifically a smartphone, a tablet computer, a desktop computer, or the like. As shown in FIG. 1, the method in this embodiment includes the following steps.

Step 101. Detect a type of glasses worn on a human face in a to-be-processed picture, where the type of the glasses is myopia glasses or hypermetropia glasses.

A facial image in the to-be-processed picture may be detected through image detection, and whether the glasses are worn on the human face may be further detected. If the glasses are worn on the human face, the type of the glasses can be further detected. Common types of glasses are the myopia glasses and the hypermetropia glasses. The myopia glasses zoom out an image in a lens area, and the hypermetropia glasses zoom in the image in the lens area. Therefore, in this embodiment, methods for restoring the image in the lens area are different for different types of glasses.

Step 102. Determine a lens area of the glasses.

There are mainly two types of glasses: obvious-frame glasses and unobvious-frame glasses. FIG. 2a shows the obvious-frame glasses, and FIG. 2b shows the unobvious-frame glasses. An entire lens of the glasses in FIG. 2a is surrounded by an outer frame, and the outer frame usually has a relatively dark color and a relatively thick frame, and is easy to detect and distinguish. For the glasses in FIG. 2b, only an upper part of a lens is surrounded by a frame, and a lower edge of the lens is exposed. The frame is relatively thin, and is uneasy to detect and distinguish. Therefore, in this embodiment, different methods may be respectively used for two types of glasses having different frames, to determine the lens area.

Step 103. Determine a deformation model of the lens area based on the type of the glasses, where the deformation model is used to indicate deformation caused by the glasses on an image in the lens area.

Different types of the glasses have different deformation models. The myopia glasses mainly zoom out the image in the lens area. Therefore, the deformation model indicates a zoom-out scale of the image in the lens area. The hypermetropia glasses mainly zoom in the image in the lens area. Therefore, the deformation model indicates a zoom-in scale of the image in the lens area. There are mainly three factors that affect a deformation degree of the image in the lens area: (1) A distance between a pixel and an optical center of a lens: The deformation radiates outwards from the optical center of the lens. The pixel being farther from the optical center indicates a greater deformation degree. (2) A distance between the pixel and a plane on which the lens is located: The human face is a three-dimensional structure, and different pixels on the human face have different distances from the plane on which the lens is located. The pixel being farther from the plane on which the lens is located indicates a greater deformation degree. (3) A lens degree size: For a same pixel, a higher lens degree indicates a greater deformation degree and a farther distance between a position of the pixel after deformation and a position of the pixel before deformation.

In this embodiment, the deformation model in the lens area may include a one-dimensional function or a two-dimensional function, and the deformation model in the lens area may include one or more functions.

Step 104. Restore the image in the lens area based on the deformation model, so as to eliminate the deformation caused by the glasses on the image in the lens area.

For the myopia glasses, the lens zooms out the image. Therefore, when the image is restored, a pixel in the lens area needs to be zoomed in based on the deformation model, so that the image in the lens area is shifted outwards (in other words, to a direction far away from the optical center) as a whole. The shifted pixel may exceed a lens frame, a pixel exceeding the lens frame is discarded, and a pixel that does not exceed the lens frame is reserved. Interpolation and smoothing processing are performed on all reserved pixels, to obtain an image after the image in the lens area is restored. The image in the lens area is zoomed in, so that the image in the lens area is extremely close to an image outside the lens area, and appears to be equivalent to an effect without the myopia glasses.

For the hypermetropia glasses, the lens zooms in the image. Therefore, when the image is restored, a pixel in the lens area needs to be zoomed out based on the deformation model, so that the image in the lens area is shifted inwards (in other words, to a direction of the optical center) as a whole. There is a blank interval between the shifted pixel and the lens frame, and there is no pixel in the blank interval. Therefore, pixel filling needs to be performed on the blank interval, and a pixel outside the lens area or a pixel obtained after the image in the lens area is deformed may be used to fill in the blank interval. After the blank interval is filled in, interpolation and smoothing processing are performed on all pixels in the lens area, to obtain an image after the image in the lens area is restored. The image in the lens area is zoomed out, so that the image in the lens area is extremely close to an image outside the lens area, and appears to be equivalent to an effect without the hypermetropia glasses.

In this embodiment, the type of the glasses worn on the human face in the to-be-processed picture is detected, and the lens area of the glasses is determined; and the deformation model of the lens area is determined based on the type of the glasses, where the deformation model is used to indicate deformation caused by the glasses on the image in the lens area, and then the image in the lens area is restored based on the deformation model, so as to eliminate the deformation caused by the glasses on the image in the lens area. The deformation caused by the glasses on the image in the lens area is eliminated, so that the to-be-processed picture is closer to a real picture and is more beautiful.

The following uses several specific embodiments to describe in detail the technical solutions of the method embodiment shown in FIG. 1.

Based on the foregoing Embodiment 1, Embodiment 2 of the present invention provides a glasses type detection method, which is mainly used to describe in detail step 101 in Embodiment 1. FIG. 3 is a flowchart of the glasses type detection method according to Embodiment 2 of the present invention. As shown in FIG. 3, the method in this embodiment may include the following steps.

Step 201. Detect a facial image in a to-be-processed picture, and determine an eye position of the facial image.

The facial image and the eye position may be detected by using an existing method, and details are not described herein.

Step 202. Extract a glasses contour feature of the facial image based on the eye position of the facial image.

Step 203. Extract a texture feature in a glasses contour of the facial image, and determine a type of glasses based on the texture feature in the glasses contour of the facial image.

Specifically, whether a texture in the glasses contour is tight may be determined based on the texture feature in the glasses contour. When the texture in the glasses contour is tight, the type of the glasses is determined as myopia glasses. When the texture in the glasses contour is not tight, the type of the glasses is determined as hypermetropia glasses.

Because the myopia glasses zoom out an image in a lens area, the texture in the glasses contour is tight. Because the hypermetropia glasses zoom in the image in the lens area, the texture in the glasses contour is sparse. Therefore, the type of the glasses can be determined based on whether the texture in the glasses contour is tight. When whether the texture in the glasses contour is tight is determined, the texture in the glasses contour may be compared with a texture outside the glasses contour. When the texture in the glasses contour is tighter than the texture outside the glasses contour, the texture in the glasses contour is determined as tight. When the texture in the glasses contour is sparser than the texture outside the glasses contour, the texture in the glasses contour is determined as untight.

Certainly, the type of the glasses may be further determined in another manner. For example, in another implementation, the facial image in the to-be-processed picture is first detected, the eye position of the facial image is determined, a facial contour feature of the facial image is extracted based on the eye position of the facial image, and the type of the glasses is determined based on the facial contour feature of the facial image. Specifically, when a facial contour is shifted inwards, the type of the glasses is determined as the myopia glasses. When the facial contour is shifted outwards, the type of the glasses is determined as the hypermetropia glasses.

Figure 4:
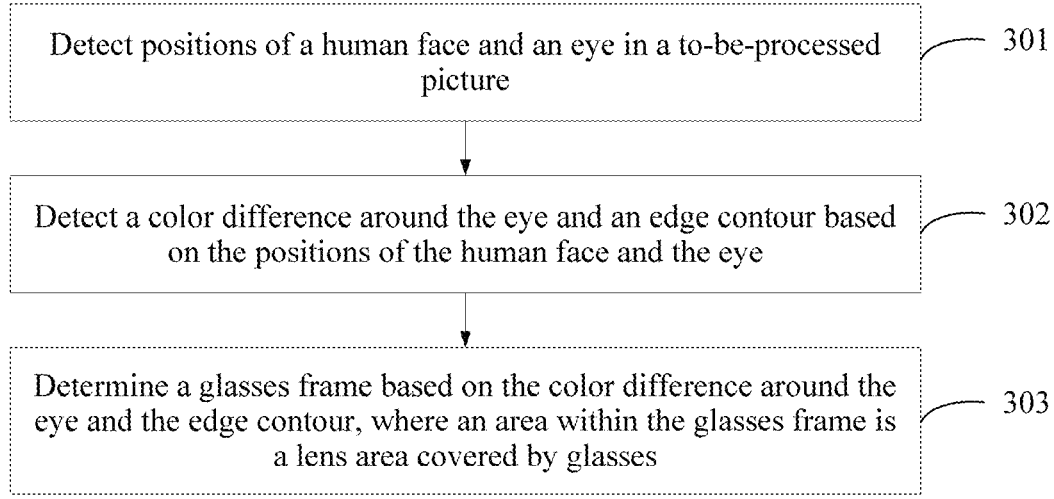
FIG. 4 is a flowchart of a method for determining a lens area according to Embodiment 3 of the present invention.

Based on the foregoing Embodiment 1, Embodiment 3 of the present invention provides a method for determining a lens area, which is mainly used to describe in detail step 102 in Embodiment 1. This embodiment mainly focuses on obvious-frame glasses. FIG. 4 is a flowchart of the method for determining a lens area according to Embodiment 3 of the present invention. As shown in FIG. 4, the method in this embodiment may include the following steps:

Step 301. Detect positions of a human face and an eye in a to-be-processed picture.

Step 302. Detect a color difference around the eye and an edge contour based on the positions of the human face and the eye.

Step 303. Determine a glasses frame based on the color difference around the eye and the edge contour, where an area within the glasses frame is a lens area of glasses.

Figure 5:
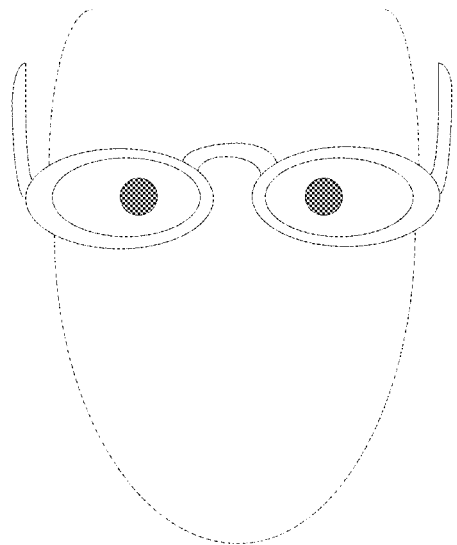
FIG. 5 is a schematic diagram of detecting a lens area of obvious-frame glasses.

Because a color of the glasses frame is quite different from a color of skin, the glasses frame and the skin may be distinguished based on the color difference around the eye, and the glasses frame is further determined based on the edge contour. FIG. 5 is a schematic diagram of detecting a lens area of obvious-frame glasses. As shown in FIG. 5, not only the lens area can be detected, but also an outer frame and an inner frame of the lens can be detected.

Figure 6:
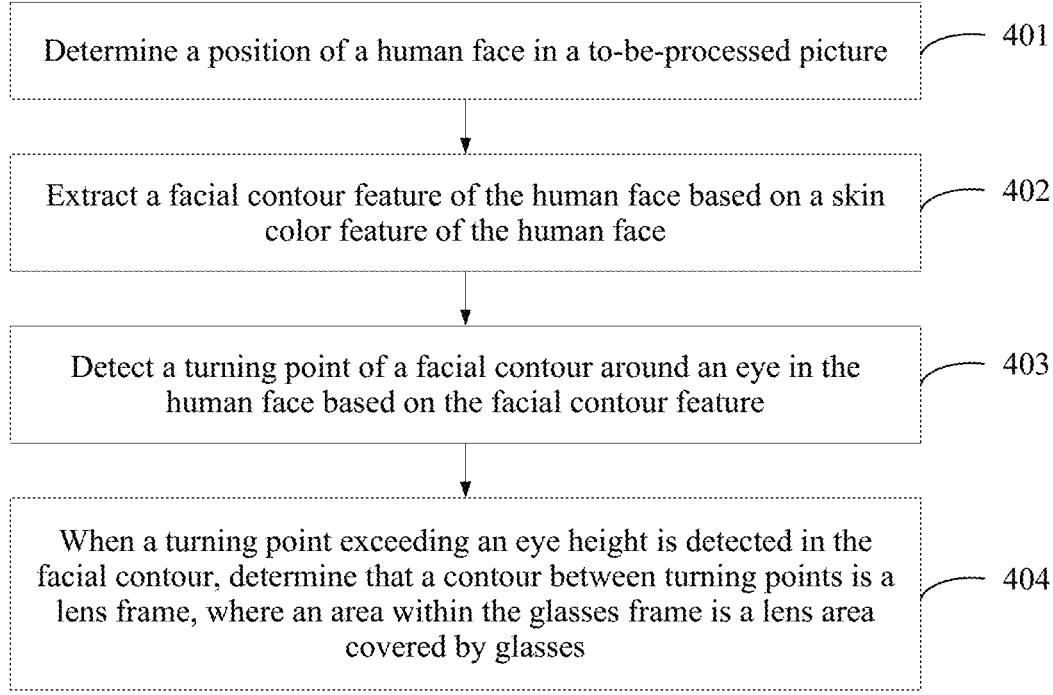
FIG. 6 is a flowchart of a method for determining a lens area according to Embodiment 4 of the present invention.

Based on the foregoing Embodiment 1, Embodiment 4 of the present invention provides a method for determining a lens area, which is mainly used to describe in detail step 102 in Embodiment 1. This embodiment mainly focuses on unobvious-frame glasses. FIG. 6 is a flowchart of the method for determining a lens area according to Embodiment 4 of the present invention. As shown in FIG. 6, the method in this embodiment may include the following steps.

Step 401. Determine a position of a human face in a to-be-processed picture.

Step 402. Extract a facial contour feature of the human face based on a skin color feature of the human face.

A skin color area and a non-skin color area may be distinguished by calculating a skin color similarity, so as to obtain the facial contour feature of the human face.

Step 403. Detect a turning point of a facial contour around an eye in the human face based on the facial contour feature.

For the unobvious-frame glasses, a color difference around glasses cannot be used to determine a glasses frame. In this embodiment, the turning point of the facial contour around the glasses is obtained, and the glasses frame is determined based on the turning point of the facial contour around the eye. Specifically, an edge line of the facial contour around the eye may be detected by using a Sobel operator, a Canny operator, a Robbert operator, a Laplacian operator, a Prewitt operator, or the like. For a direction of the edge line, shape fitting may be performed through Hough transformation, and then the direction of the fitted edge line is obtained. Whether the facial contour has the turning point is determined based on the direction of the edge line. When the direction of the edge line is discontinuous, it is determined that the facial contour has the turning point. When the direction of the edge line is continuous, it is determined that the facial contour does not have the turning point.

Step 404. When a turning point exceeding an eye height is detected in the facial contour, determine that a contour between turning points is a lens frame, where an area within the frame is a lens area of glasses.

Figure 7:
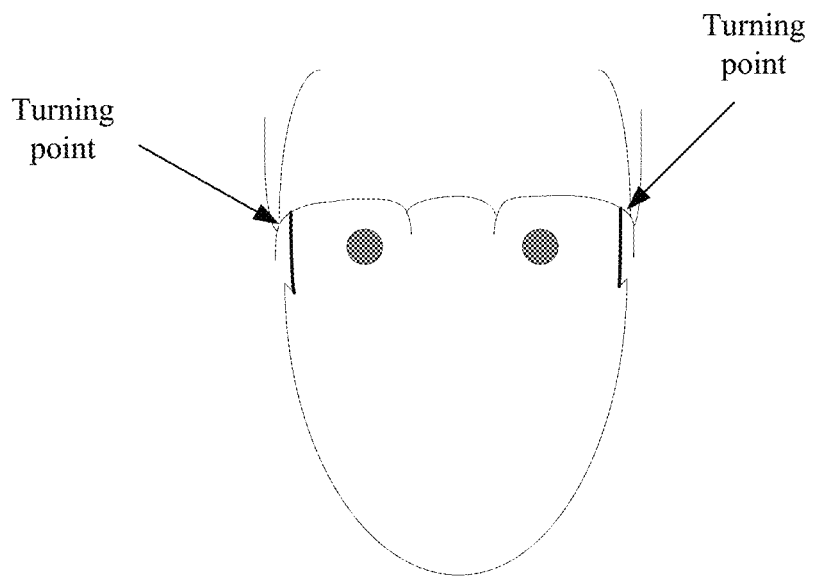
FIG. 7 is a schematic diagram of detecting a lens area of unobvious-frame glasses.

When the glasses are worn on the human face, the glasses block the facial contour, resulting in the turning point in the facial contour. Therefore, when the turning point exceeding the eye height is detected in the human face, it indicates that the glasses are worn on the human face. FIG. 7 is a schematic diagram of detecting a lens area of unobvious-frame glasses. As shown in FIG. 7, the unobvious-frame glasses are worn on a human face. There is a frame on a side, exceeding an eye height, of the unobvious-frame glasses, and there is no frame on a side below the eye height. The glasses block the facial contour, resulting in a turning point in a facial contour that is higher than an eye position on both sides of a face. Therefore, a contour between turning points may be determined as a lens frame.

Figure 8:
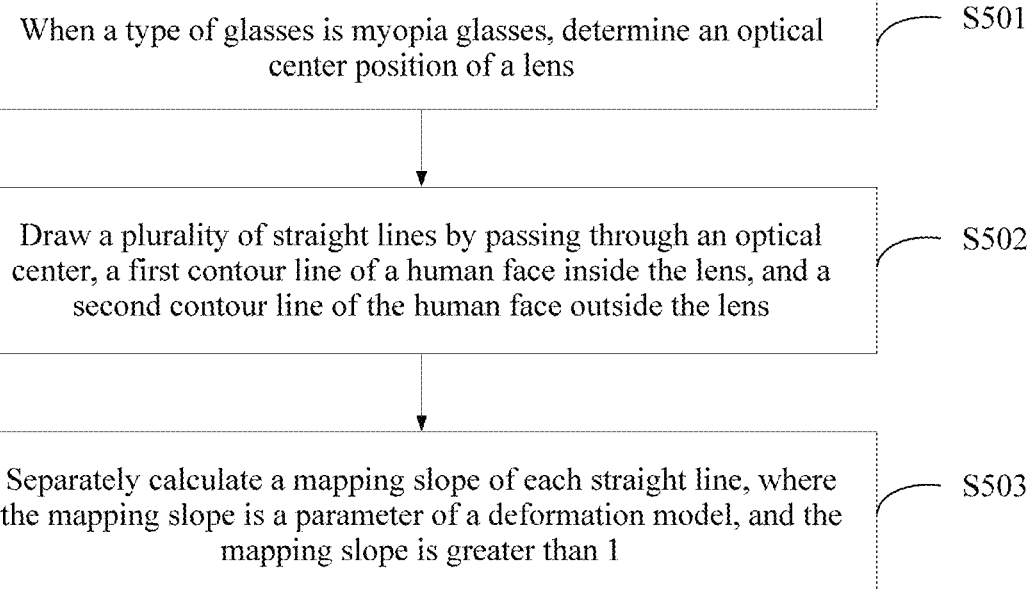
FIG. 8 is a flowchart of a method for determining a deformation model of a lens area according to Embodiment 5 of the present invention.

Based on the foregoing Embodiment 1, Embodiment 5 of the present invention provides a method for determining a deformation model of a lens area, which is mainly used to describe in detail step 103 in Embodiment 1. FIG. 8 is a flowchart of the method for determining a deformation model of a lens area according to Embodiment 5 of the present invention. As shown in FIG. 8, the method in this embodiment may include the following steps.

Step 501. When a type of glasses is myopia glasses, determine an optical center position of a lens.

An optical center may be a central position of the lens. Usually, the optical center coincides with a center of an eye pupil. Therefore, the optical center may also be a central position of the pupil. Based on an optical feature of the lens, light passing through the optical center of the lens does not change a direction, and light passing through another area of the lens is refracted and changes a direction.

Step 502. Draw a plurality of straight lines by passing through an optical center, a first contour line of a human face inside the lens, and a second contour line of the human face outside the lens.

Step 503. Separately calculate a mapping slope of each straight line, where the mapping slope is a parameter of a deformation model, and the mapping slope is greater than 1.

Figure 9:
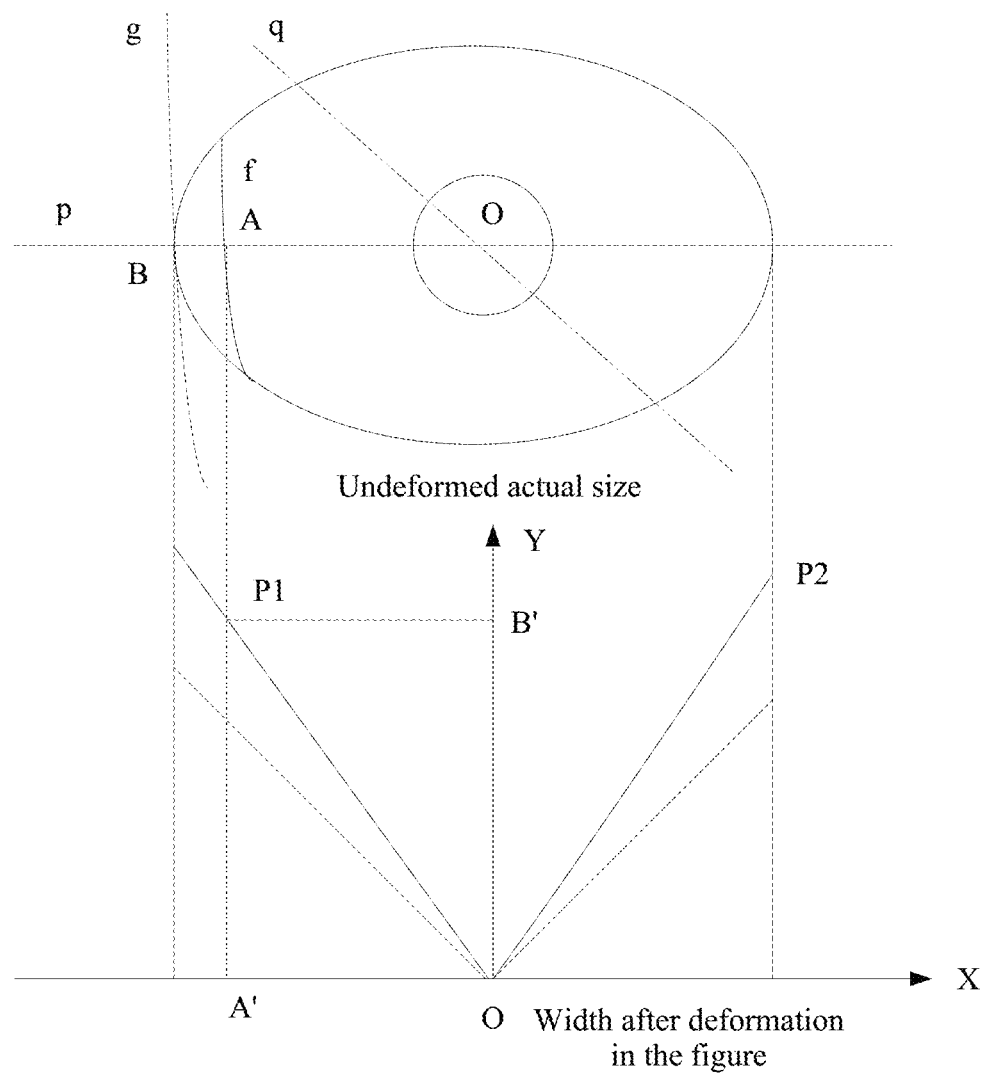
FIG. 9 is a schematic diagram of lens deformation of myopia glasses.

FIG. 9 is a schematic diagram of lens deformation of myopia glasses. As shown in FIG. 9, O indicates an optical center, f indicates a first contour line, g indicates a second contour line, and p indicates any straight line passing through the optical center, the first contour line, and the second contour line. In this embodiment, a first straight line p is used as an example to describe how to calculate a mapping slope of a pixel on the straight line p. Certainly, a first straight line may also be a q straight line shown in FIG. 9, A is an intersection point of the first straight line p and the first contour line f, and B is an intersection point of the first straight line p and the second contour line g.

After the first straight line is determined, a one-dimensional deformation function of the pixel on the first straight line may be calculated, and a parameter of the one-dimensional deformation function may be a slope of the first straight line. An example shown in FIG. 9 is used as an example. An origin of a coordinate system in FIG. 9 is corresponding to a position of the optical center O, the X-axis indicates a size of an image in a lens after deformation, and the Y-axis indicates a size of the image in the lens before deformation. In an X-axis direction, left or right extension from the origin indicates a distance from the optical center O in a p straight line direction. Straight lines OP1 and OP2 in the figure indicate a mapping relationship between a deformation size (a size in the figure) of the image in the lens and an actual size. A slope of OP1 is the same as that of OP2, and the slope is greater than 1. A constraint condition that the straight line OP1 should meet is: OP1 is equal to a ratio of a size of any pixel on an edge of a facial contour outside the lens to a size of a corresponding pixel on an edge of a face in the lens, for example, a ratio of OB to OA. In the figure, OA indicates a first distance from the optical center O to the first contour line f, and OB indicates a second distance from the optical center O to the second contour line g. A size of OA after deformation is OA'. After mapping of the straight line OP1, a size OB' of OA before deformation is obtained on the vertical axis. Likewise, a size of another pixel before deformation on the first straight line p may be obtained. Because the lens is centrosymmetric, OP2 may be obtained through OP1 mirroring. A dashed line whose slope is 1 in FIG. 9 indicates a plain glasses deformation function, and plain glasses do not deform a pixel.

Optionally, in this embodiment, slopes of a plurality of straight lines may be the same or may be different. When the slopes of the plurality of the straight lines are the same, after the slope of the first straight line is determined, slopes of all straight lines are obtained. When the slopes of the plurality of the straight lines are different, in a method, the straight line q is drawn by passing through the optical center, and based on central symmetry of the lens, a slope of the straight line q is obtained by using the same method as the straight line p. Likewise, slopes of all straight lines that pass through the optical center may be obtained, so that a restored position of any pixel in a lens area may be obtained based on a slope of a straight line. In practice, the straight lines that pass through the optical center are separated by an extremely small angle. Therefore, slopes of finite straight lines may be calculated.

In another method, after the slope of the first straight line is calculated, a slope change rate is calculated based on the slope of the first straight line and a slope of an adjacent straight line, and a slope of another straight line is calculated based on the slope change rate and the slope of the first straight line, so as to obtain the slopes of the finite straight lines in the lens area.

After a slope of each straight line is calculated, the image in the lens area is restored based on the slope of the straight line. Specifically, a position of each pixel on each straight line before deformation is calculated based on a mapping slope of each straight line, and then whether the position of each pixel before deformation exceeds a lens frame is determined. When the position of any pixel before deformation does not exceed the lens frame, the pixel is reserved. When the position of any pixel before deformation exceeds the lens frame, the pixel is discarded. Interpolation and smoothing processing are performed on positions of all reserved pixels after deformation, to obtain an image after the image in the lens area is restored.

Optionally, a deformation model of the lens may be represented by polar coordinates, and the deformation model is, where, represents the distance from the pixel to the optical center, represents an included angle between two straight lines, and h(x) is a deformation parameter of a section through the optical center in the figure.

Figure 10:
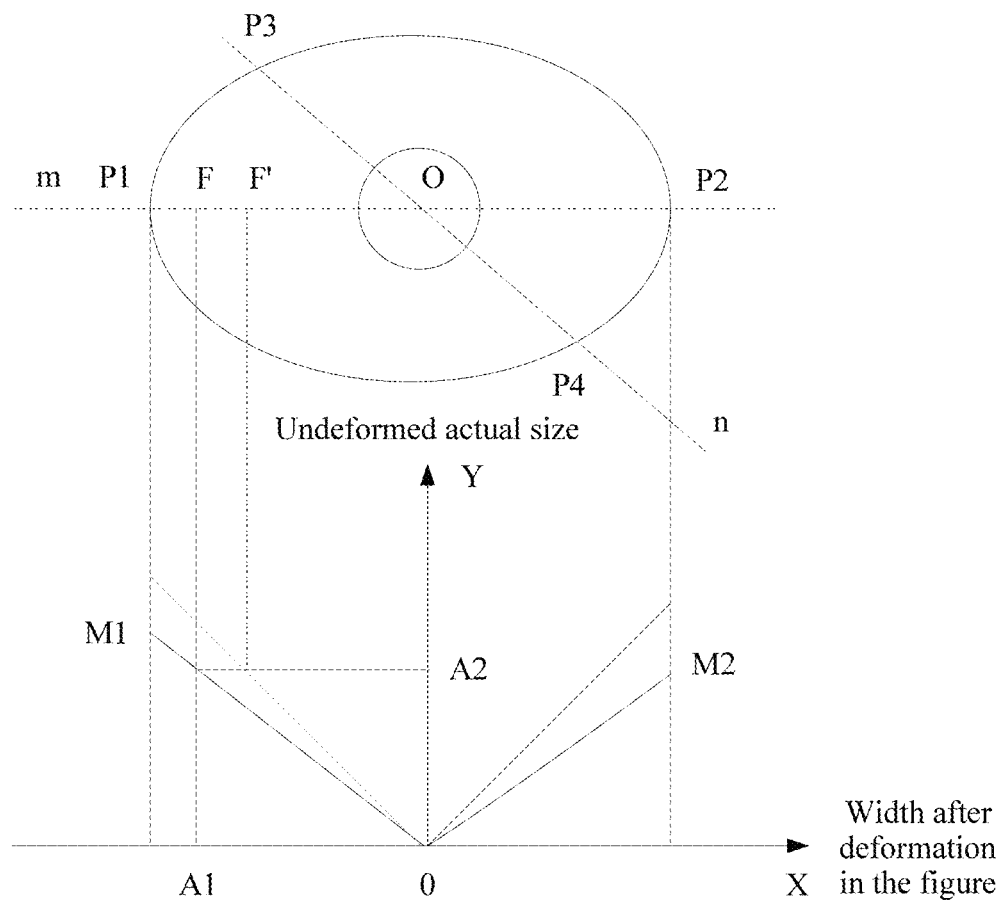
FIG. 10 is a schematic diagram of lens deformation of hypermetropia glasses.

In Embodiment 5, the myopia glasses are used as an example for description, and the method for determining a deformation model of a lens area of myopia glasses is similar to a method for determining a deformation model of a lens area of hypermetropia glasses. FIG. 10 is a schematic diagram of lens deformation of the hypermetropia glasses. As shown in FIG. 10, O indicates an optical center, two straight lines m and n are drawn by passing through the optical center, intersection points of the straight line m and a glasses frame are P1 and P2, intersection points of the straight line n and the glasses frame are P3 and P4. In FIG. 10, the X-axis indicates a size of an image in a lens after deformation, and the Y-axis indicates a size of the image in the lens before deformation. OM1 and OM2 indicate a mapping relationship between a deformation size of the image in the lens and an actual size. A slope of OM1 is the same as that of OM2. Different from the myopia glasses, slopes of OM1 and OM2 are less than 1. Therefore, in the hypermetropia glasses, as shown in FIG. 10, a position of a pixel F' after deformation is F, and OM indicates a size of the pixel F' after deformation. After OM1 mapping, an actual size OA2 of the pixel F' before deformation is obtained.

For the hypermetropia glasses, after it is determined that a slope of each straight line is calculated, a position of any pixel on each straight line before deformation is calculated based on the mapping slope of each straight line, a first image is obtained based on positions of all pixels in a lens area before deformation, and there is a blank interval between the first image and a lens frame. The blank interval is filled in by using a pixel outside the lens area or a pixel in the first image, and interpolation and smoothing processing are performed on the pixel of the first image and a pixel of the blank interval, to obtain an image after the image in the lens area is restored.

It should be noted that, the method in this embodiment of the present invention may be used to perform post-processing on a static picture after a photo is taken, or used to process in real time a glasses-wearing human face during preview before the photo is taken or during video recording, and directly display or store a video stream after a glasses area is restored. For a processed image, although the foregoing embodiment is described by using an example in which the image includes one human face, an application scenario in this embodiment of the present invention is not limited to the image that includes only one human face, and can also be applied to an image that includes a plurality of human faces. A difference between multi-human face processing and single-human face processing lies in detection of a first step. If one human face is detected, restoration processing of one human face is performed. If the plurality of the human faces are detected, each detected human face is separately processed by using the method for processing one human face.

Figure 11:
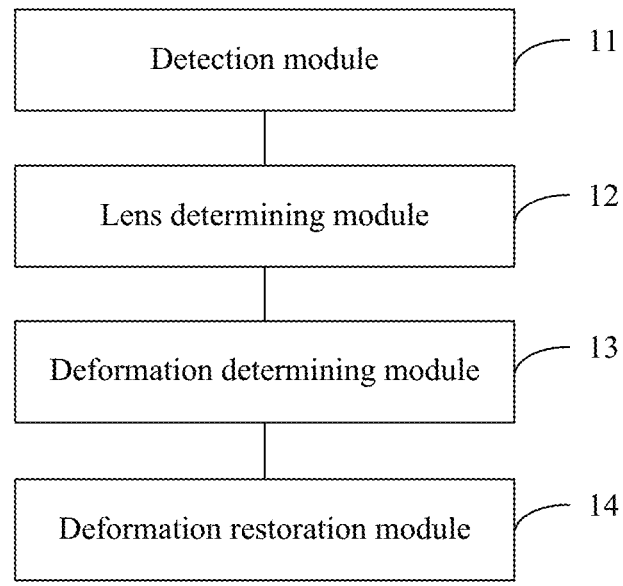
FIG. 11 is a schematic structural diagram of a picture processing apparatus according to Embodiment 6 of the present invention.

FIG. 11 is a schematic structural diagram of a picture processing apparatus according to Embodiment 6 of the present invention. As shown in FIG. 11, the picture processing apparatus in this embodiment includes:

a detection module 11, configured to detect a type of glasses worn on a human face in a to-be-processed picture, where the type of the glasses is myopia glasses or hypermetropia glasses;

a lens determining module 12, configured to determine a lens area of the glasses;

a deformation determining module 13, configured to determine a deformation model of the lens area based on the type of the glasses, where the deformation model is used to indicate deformation caused by the glasses on an image in the lens area; and a deformation restoration module 14, configured to restore the image in the lens area based on the deformation model, so as to eliminate the deformation caused by the glasses on the image in the lens area.

Optionally, the detection module 11 is specifically configured to:

detect a facial image in the to-be-processed picture, and determine an eye position of the facial image;

extract a glasses contour feature of the facial image based on the eye position of the facial image; and extract a texture feature in a glasses contour of the facial image, and determine the type of the glasses based on the texture feature in the glasses contour of the facial image.

Alternatively, the detection module 11 is specifically configured to: detect a facial image in the to-be-processed picture, and determine an eye position of the facial image;

extract a facial contour feature of the facial image based on the eye position of the facial image; and determine the type of the glasses based on the facial contour feature.

Optionally, the determining the type of the glasses based on the facial contour feature is specifically: when the facial contour is shifted inwards, determining that the type of the glasses is the myopia glasses; and when the facial contour is shifted outwards, determining that the type of the glasses is the hypermetropia glasses.

Optionally, the determining the type of the glasses based on the texture feature in the glasses contour of the facial image is specifically: determining, based on the texture feature in the glasses contour, whether a texture in the glasses contour is tight; when the texture in the glasses contour is tight, determining that the type of the glasses is the myopia glasses; and when the texture in the glasses contour is not tight, determining that the type of the glasses is the hypermetropia glasses.

Optionally, the lens determining module 12 is specifically configured to:

determine a position of the human face in the to-be-processed picture;

extract the facial contour feature of the human face based on a skin color feature of the human face;

detect a turning point of a facial contour around an eye in the human face based on the facial contour feature; and when a turning point exceeding an eye height is detected in the facial contour, determine that a contour between turning points is a lens frame, where an area within the lens frame is the lens area of the glasses.

Optionally, the deformation determining module 13 is specifically configured to:

when the type of the glasses is the myopia glasses, determine an optical center position of a lens;

draw a plurality of straight lines by passing through the optical center, a first contour line of the human face inside the lens, and a second contour line of the human face outside the lens; and separately calculate a mapping slope of each straight line, where the mapping slope is a parameter of the deformation model, and the mapping slope is greater than 1.

Correspondingly, the deformation restoration module 14 is specifically configured to:

calculate a position of each pixel on each straight line before deformation based on the mapping slope of each straight line;

determine whether the position of each pixel before deformation exceeds the lens frame;

when the position of any pixel before deformation does not exceed the lens frame, reserve the pixel;

when the position of any pixel before deformation exceeds the lens frame, discard the pixel; and perform interpolation and smoothing processing on positions of all reserved pixels after deformation, to obtain an image after the image in the lens area is restored.

Optionally, the deformation determining module 13 is specifically configured to:

when the type of the glasses is the hypermetropia glasses, determine an optical center position of a lens;

draw a plurality of straight lines by passing through the optical center, a first contour line of the human face inside the lens, and a second contour line of the human face outside the lens; and separately calculate a mapping slope of each straight line, where the mapping slope is a parameter of the deformation model, and the mapping slope is less than 1.

Correspondingly, the deformation restoration module 14 is specifically configured to:

calculate a position of any pixel on each straight line before deformation based on the mapping slope of each straight line;

obtain a first image based on positions of all pixels in the lens area before deformation, where there is a blank interval between the first image and the lens frame;

fill in the blank interval by using a pixel outside the lens area or a pixel in the first image; and perform interpolation and smoothing processing on the pixel of the first image and a pixel of the blank interval, to obtain an image after the image in the lens area is restored.

Optionally, slopes of the plurality of the straight lines are the same.

Optionally, slopes of the plurality of the straight lines are different, and the deformation determining module 13 is specifically configured to:

calculate a slope of a first straight line, where the first straight line is any one of the plurality of the straight lines;

calculate a slope of a second straight line adjacent to the first straight line;

calculate a slope change rate based on the slope of the first straight line and the slope of the second straight line; and calculate a slope of another straight line based on the slope change rate and the slope of the first straight line.

The apparatus in this embodiment may be configured to perform the methods in Embodiment 1 to Embodiment 5. Specific implementations and technical effects are similar, and details are not described herein again.

It should be noted that, it should be understood that the module division in the foregoing picture processing apparatus is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

Figure 12:
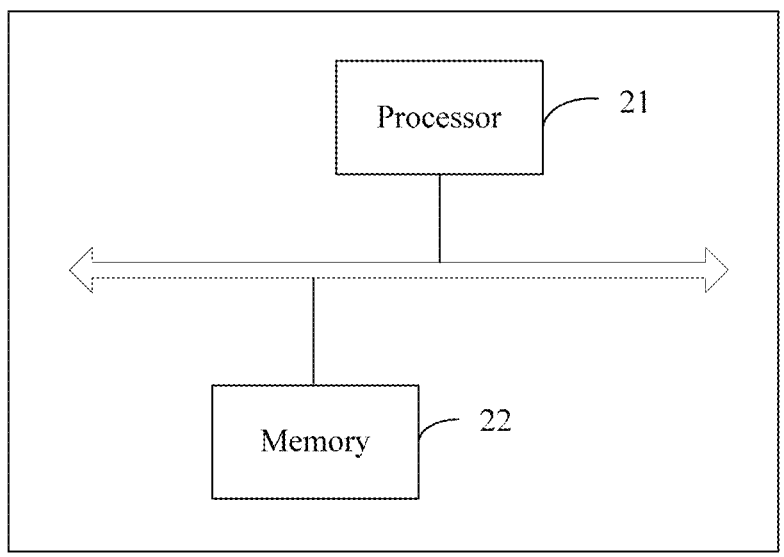
FIG. 12 is a schematic structural diagram of a picture processing apparatus according to Embodiment 7 of the present invention.

FIG. 12 is a schematic structural diagram of a picture processing apparatus according to Embodiment 7 of the present invention. As shown in FIG. 12, the picture processing apparatus in this embodiment includes a processor 21 and a memory 22. The memory 22 is connected to and communicates with the processor 21 by using a bus. The memory 22 is configured to store an instruction. The processor 21 is configured to execute the instruction stored in the memory 22, so that the picture processing apparatus performs the methods in the foregoing method Embodiment 1 to Embodiment 5. Specific implementations and technical effects are similar, and details are not described herein again.

Optionally, the picture processing apparatus may further include a transmitter and a receiver, the transmitter is configured to send data to another device, and the receiver is configured to receive data sent by another device.

It may be understood that the foregoing processor may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

The bus in the embodiments of the present invention may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of the present invention is not limited to only one bus or one type of bus.

What is claimed is:

1. A method, comprising:
    detecting, by a processor, a type of glasses worn on a human face in a to-be-processed picture, wherein the type of the glasses is myopia glasses or hypermetropia glasses, and wherein determining the type of glasses comprises:
        determining that the type of the glasses is myopia glasses; or
        determining that the type of the glasses is hypermetropia glasses;
    determining, by the processor, a lens area of the glasses;

determining, by the processor, a deformation model of the lens area according to the type of the glasses, wherein the deformation model indicates deformation caused by the glasses on an image in the lens area, and the deformation model that is selected corresponds to the determined type of glasses; and restoring the image in the lens area according to the deformation model, wherein restoring the image in the lens area according to the deformation model reduces the deformation caused by the glasses on the image in the lens area.

2. The method according to claim 1, wherein detecting the type of the glasses worn on the human face in the to-be-processed picture comprises:

detecting a facial image in the to-be-processed picture;
determining an eye position of the facial image;
extracting a glasses contour of the facial image according to the eye position of the facial image;
extracting a texture feature in the glasses contour; and
determining the type of the glasses according to the texture feature.

3. The method according to claim 2, wherein determining the type of the glasses according to the texture feature comprises:

determining, according to the texture feature in the glasses contour, whether a texture in the glasses contour is tight;
when the texture in the glasses contour is tight, determining that the type of the glasses is the myopia glasses; and
when the texture in the glasses contour is not tight, determining that the type of the glasses is the hypermetropia glasses.

4. The method according to claim 1, wherein detecting the type of the glasses worn on the human face in the to-be-processed picture comprises:

detecting a facial image in the to-be-processed picture;
determining an eye position of the facial image;
extracting a facial contour feature of the facial image according to the eye position of the facial image; and
determining the type of the glasses according to the facial contour feature.

5. The method according to claim 4, wherein determining the type of the glasses according to the facial contour feature comprises:

when a facial contour is shifted inwards, determining that the type of the glasses is the myopia glasses; and
when the facial contour is shifted outwards, determining that the type of the glasses is the hypermetropia glasses.

6. The method according to claim 1, wherein determining the lens area of the glasses comprises:

determining a position of the human face in the to-be-processed picture;
extracting a facial contour feature of the human face according to a skin color feature of the human face;
detecting a turning point of a facial contour around an eye in the human face according to the facial contour feature; and
when a turning point exceeding an eye height is detected, determining that a contour between turning points is a lens frame, wherein an area within the lens frame is the lens area of the glasses.

7. The method according to claim 6, wherein determining the deformation model of the lens area according to the type of the glasses comprises:

when the type of the glasses is the myopia glasses, determining an optical center position of a lens corresponding to the lens area;
drawing a plurality of straight lines by passing through the optical center position, a first contour line of the human face inside the lens, and a second contour line of the human face outside the lens; and
separately calculating a mapping slope of each of the plurality of straight lines, wherein the mapping slope is a parameter of the deformation model, and the mapping slope is greater than 1; and
wherein the restoring the image in the lens area according to the deformation model comprises:
calculating a position of each pixel on each of the plurality of straight lines before deformation according to a respective mapping slope of each of the plurality of straight lines;
determining whether the position of each pixel before deformation exceeds the lens frame;
when a position of a respective pixel of each pixel before deformation does not exceed the lens frame, reserving the respective pixel;
when a position of a respective pixel of each pixel before deformation exceeds the lens frame, discarding the respective pixel; and
performing interpolation and smoothing processing on positions of all reserved pixels after deformation to obtain an image after the image in the lens area is restored.

8. The method according to claim 6, wherein determining the deformation model of the lens area according to the type of the glasses comprises:

when the type of the glasses is the hypermetropia glasses, determining an optical center position of a lens;
drawing a plurality of straight lines by passing through the optical center position, a first contour line of the human face inside the lens, and a second contour line of the human face outside the lens; and
separately calculating a mapping slope of each of the plurality of straight lines, wherein the mapping slope is a parameter of the deformation model, and the mapping slope is less than 1; and
wherein the restoring the image in the lens area based on the deformation model comprises:
calculating a position of a pixel on each of the plurality of straight lines before deformation according to a respective mapping slope of each of the plurality of straight lines;
obtaining a first image according to positions of all pixels in the lens area before deformation, wherein there is a blank interval between the first image and the lens frame;
filling in the blank interval using a pixel outside the lens area or a pixel in the first image; and
performing interpolation and smoothing processing on the pixel of the first image and a pixel of the blank interval to obtain an image after the image in the lens area is restored.

9. The method according to claim 8, wherein slopes of the plurality of the straight lines are the same.

10. The method according to claim 8, wherein slopes of the plurality of the straight lines are different, and the separately calculating a mapping slope of each straight line comprises:

calculating a slope of a first straight line of the plurality of the straight lines;

calculating a slope of a second straight line of the plurality of straight lines adjacent to the first straight line;

calculating a slope change rate according the slope of the first straight line and the slope of the second straight line; and calculating a slope of another straight line of the plurality of straight lines according to the slope change rate and the slope of the first straight line.

11. An apparatus, comprising a memory and a processor, wherein the memory is configured to store an instruction, and the processor is configured to execute the instruction stored in the memory, to cause the apparatus to:

detect a type of glasses worn on a human face in a to-be-processed picture, wherein the type of the glasses is myopia glasses or hypermetropia glasses, and wherein detecting the type of glasses comprises:

detecting that the type of the glasses is myopia glasses; or detecting that the type of the glasses is hypermetropia glasses;

determine a lens area of the glasses;

determine a deformation model of the lens area according to the type of the glasses, wherein the deformation model indicates deformation caused by the glasses on an image in the lens area, and wherein the determined deformation model corresponds to the detected type of the glasses; and restore the image in the lens area according to the deformation model, wherein restoring the image in the lens area according to the deformation model reduces the deformation caused by the glasses on the image in the lens area.

12. The apparatus according to claim 11, wherein the processor is configured to execute the instruction stored in the memory, to cause the apparatus to:

detect a facial image in the to-be-processed picture;

determine an eye position of the facial image;

extract a glasses contour of the facial image according to the eye position of the facial image; and extract a texture feature in the glasses contour, and determine the type of the glasses according to the texture feature.

13. The apparatus according to claim 12, wherein the processor is configured to execute the instruction stored in the memory, to cause the apparatus to:

determine, according to the texture feature in the glasses contour, whether a texture in the glasses contour is tight;

when the texture in the glasses contour is tight, determine that the type of the glasses is the myopia glasses; and when the texture in the glasses contour is not tight, determine that the type of the glasses is the hypermetropia glasses.

14. The apparatus according to claim 11, wherein the processor is configured to execute the instruction stored in the memory, to cause the apparatus to:

detect a facial image in the to-be-processed picture, and determine an eye position of the facial image;

extract a facial contour feature of the facial image according to the eye position of the facial image; and determine the type of the glasses according to the facial contour feature.

15. The apparatus according to claim 14, wherein the processor is configured to execute the instruction stored in the memory, to cause the apparatus to:

when a facial contour is shifted inwards, determine that the type of the glasses is the myopia glasses; and when the facial contour is shifted outwards, determine that the type of the glasses is the hypermetropia glasses.

16. The apparatus according to claim 11, wherein the processor is configured to execute the instruction stored in the memory, to cause the apparatus to:

determine a position of the human face in the to-be-processed picture;

extract a facial contour feature of the human face according to a skin color feature of the human face;

detect a turning point of a facial contour around an eye in the human face according to the facial contour feature; and when a turning point exceeding an eye height is detected, determine that a contour between turning points is a lens frame, wherein an area within the lens frame is the lens area of the glasses.

17. The apparatus according to claim 16, wherein the processor is configured to execute the instruction stored in the memory, to cause the apparatus to:

when the type of the glasses is the myopia glasses, determine an optical center position of a lens corresponding to the lens area;

draw a plurality of straight lines by passing through the optical center position, a first contour line of the human face inside the lens, and a second contour line of the human face outside the lens;

separately calculate a mapping slope of each of the plurality of straight lines, wherein the mapping slope is a parameter of the deformation model, and the mapping slope is greater than 1;

calculate a position of each pixel on each of the plurality of straight lines before deformation according to the mapping slope of each of the plurality of straight lines;

determine whether the position of each pixel before deformation exceeds the lens frame;

when a position of a respective pixel before deformation does not exceed the lens frame, reserve the respective pixel;

when a position of a respective pixel of each pixel before deformation exceeds the lens frame, discard the respective pixel; and perform interpolation and smoothing processing on positions of all reserved pixels after deformation, to obtain an image after the image in the lens area is restored.

18. The apparatus according to claim 16, wherein the processor is configured to execute the instruction stored in the memory, to cause the apparatus to:

when the type of the glasses is the hypermetropia glasses, determine an optical center position of a lens;

draw a plurality of straight lines by passing through the optical center position, a first contour line of the human face inside the lens, and a second contour line of the human face outside the lens;

separately calculate a mapping slope of each straight line, wherein the mapping slope is a parameter of the deformation model, and the mapping slope is less than 1;

calculate a position of any pixel on each of the plurality of straight lines before deformation according to the mapping slope of each of the plurality of straight lines;

obtain a first image according to positions of all pixels in the lens area before deformation, wherein there is a blank interval between the first image and the lens frame;

fill in the blank interval using a pixel outside the lens area or a pixel in the first image; and perform interpolation and smoothing processing on the pixel of the first image and a pixel of the blank interval, to obtain an image after the image in the lens area is restored.

19. The apparatus according to claim 18, wherein slopes of the plurality of the straight lines are the same.

20. The apparatus according to claim 18, wherein slopes of the plurality of the straight lines are different, and the processor is configured to execute the instruction stored in the memory, to cause the apparatus to:
    calculate a slope of a first straight line of the plurality of the straight lines;
    calculate a slope of a second straight line of the plurality of straight lines adjacent to the first straight line;
    calculate a slope change rate according to the slope of the first straight line and the slope of the second straight line; and
    calculate a slope of another straight line of the plurality of straight lines according to the slope change rate and the slope of the first straight line.

* * * * *